United States Patent
Podschus et al.

[15] 3,676,366

[45] July 11, 1972

[54] PROCESS FOR THE PRODUCTION OF HIGHLY POROUS BEAD-FORM SILICA CATALYST SUPPORTS

[72] Inventors: Ernst Podschus, Leverkusen; Ludwig Dorn, Koeln-Stammheim; Gerhard Heinze, Schildgen, all of Germany

[73] Assignee: Farbenfabriken Bayer Aktiengesellschaft, Leverkusen, Germany

[22] Filed: Aug. 19, 1969

[21] Appl. No.: 851,477

[30] Foreign Application Priority Data

Sept. 24, 1968   Germany.....................P 17 92 601.1

[52] U.S. Cl..............................252/448, 252/450, 252/451, 252/477 R
[51] Int. Cl. .......................................................B01j 11/44
[58] Field of Search...............................252/477, 448, 450

[56] References Cited

UNITED STATES PATENTS

| | | | |
|---|---|---|---|
| 2,253,285 | 8/1941 | Connolly | 196/52 |
| 3,367,884 | 2/1968 | Reid | 252/455 |
| 1,818,453 | 8/1931 | Baylis | 252/450 X |
| 1,916,902 | 7/1933 | Wilbur | 252/450 X |
| 3,458,393 | 7/1969 | Battista | 162/3 |
| 1,884,709 | 10/1932 | Jenkins | 252/450 X |
| 1,838,621 | 12/1931 | Haseman | 252/450 X |
| 3,296,151 | 1/1967 | Heiner | 252/448 |
| 2,964,481 | 12/1960 | Cramer | 252/445 |
| 2,665,258 | 1/1954 | Lebeis | 252/448 |
| 3,464,928 | 9/1969 | Mathies | 252/441 |

*Primary Examiner*—Daniel E. Wyman
*Assistant Examiner*—Philip M. French
*Attorney*—Burgess, Dinklage & Sprung

[57] ABSTRACT

Catalyst supports in bead form having a porosity of more than 60 percent formed by suspending finely divided silicate and/or silica fillers, carbonates, metal oxides and hydroxides compatible with a silica sol, in a silica sol so that the total weight of the solids is at least 50 percent by weight based on the silica content of the silica sol, dispersing the resulting mixture into drops of the required size, gelling the drops in a water-immiscible medium, separating the resulting granulate from the medium, subjecting the granulate to a heat treatment at 100° to 800° C, and subsequent acid treatment to remove a major portion of the cations, and washing the acid treated granulates.

10 Claims, No Drawings

PROCESS FOR THE PRODUCTION OF HIGHLY POROUS BEAD-FORM SILICA CATALYST SUPPORTS

This invention relates to a process for the production of highly porous bead-form catalyst supports consisting essentially of silica.

Catalyst supports have to meet special requirements in many respects. Firstly, the skeleton substance as such should not develop any catalytic side effects. Secondly, there must be a certain degree of porosity which enables the support to be uniformly impregnated with the catalytically active components and subsequently guarantees the rapid diffusion of gas from the surface of the granules to the active centers inside and vice versa.

Finally, mechanical resistance is also required, and must remain intact even after impregnation and during service under normal operating conditions. Hardness and resistance to abrasion are particularly important so far as catalysts used in fluidized-bed reactions are concerned.

Catalyst supports are usually prepared by compressing kieselguhr, silica gel, bentonites, fuller's earths and so on, for which purpose the starting mixture which is made into a paste by the addition of water and, optionally, binders, is formed by means of granulating machines, and the resulting moldings are dried and subjected to treatment at elevated temperatures for hardening purposes. Apart from the fact that it is difficult by these processes to obtain supports that are suitable both in terms of size and shape for use in fluidized-bed processes, their mechanical strength and porosity is also inadequate for many purposes.

In one known process for the production of silica-containing gel grains, preferably in bead form, a sodium silicate solution and a dilute sulphuric acid or aluminum sulphate solution are used as starting materials. The unstable hydrosol formed when the components are combined, which has an effective life of a few seconds at the most, is distributed in drop form in an organic phase in which it solidifies into gel grains (German Patent Specification No. 896,189). The process in question is used for the production of cracking catalysts. It is also known that the abrasion of bead-granulates such as these can be improved by dispersing finely divided solid additives in the hydrosol, for which purpose the additive particles should have an average diameter, determined by weighing, of from 1 to 5 microns (German Pat. Specification No. 1,096,336). The aforementioned processes may also be used for the production of catalyst supports, although they have been found to show a number of disadvantages in this respect.

The neutral salt stoichiometrically formed during preparation remains trapped in the beads and has to be dissolved out by a laborious washing process before further processing. Otherwise, calcination would be accompanied by sintering. In addition, the short effective life of the hydrosol makes it difficult to produce the small beads required for fluidized-bed reactions by mechanically dispersing the hydrosol in the organic phase with nozzles, centrifugal discs and so on on because of the danger of premature sol-gel conversion. Finally, the gel grains produced from the unstable hydrosol inevitably accumulate with a high specific surface of from 200 to 500 square meters/gram (according to the method of Brunauer, Emmet and Teller, J. Am. Chem. Soc. 60 (1939), pages 309 ff. thereinafter referred to as BET) and a large number of very narrow pores, and for this reason show a relatively limited absorption capacity for liquids. In addition, the highly active gel itself develops specific catalytic effects so that concurrent reactions, cracking reactions, in particular, occur.

In order to eliminate some of these deficiencies, therefore, the gel grains are frequently subjected to heat treatment in an atmosphere of steam, to reduce the specific surface and cracking activity and to increase the number of wider pores and hence the absorption capacity for liquids. Apart from these desirable changes, however, the steam treatment results in a reduction in mechanical strength.

Another process is known in which powdered solids are stirred with an aqueous stable silica sol with a specific BET surface of from 150 to 400 square meters/gram to form a free-flowing suspension with a pH value below 10, which is then mixed with comparatively small quantities of a second suspension of finely divided magnesium oxide in water, after which the gel-forming mixture of the two suspensions is dispersed in drop form in a liquid immiscible with water until the sol-gel conversion begins (German Auslegeschrift No. 1,187,588). It is possible by this process to agglomerate powdered solids with a silica sol to form bead-form granules. The strength of the beads and their porosity are governed by the composition and surface properties of the powdered solid, by its particle size as regards both primary particles and secondary structure and by the ratio of silica gel (from silica sol) to powder. Beads with a water-absorbing capacity of up to 60 g/100 g, corresponding to porosity values of up to 50 percent, are obtained from mixtures of silica sols with different commercially available silica and silicate fillers.

The present invention provides a process for the production of catalyst support consisting essentially of silica in bead form with a porosity in excess of 60 percent which process comprises suspending solids in a silica sol, dispersing the mixture into drops of the required size, gelling these drops in a medium immiscible with water and separating the granulate from this medium. In this process finely divided silicates and optionally silica fillers and/or carbonates, metal oxides or hydroxides compatible with the silica sol are suspended as solids therein, the total quantity of powdered solids amounting to at least 50 percent by weight, based on the silica content of the silica sol. The granulates thus obtained are heat-treated at temperatures from 100° to 800° C., optionally after they have been washed, most of the cations being subsequently removed from the granulates by acid treatment and the acid-treated granulates being washed and optionally subjected to a second heat treatment at temperatures of from 200° to 800° C.

The silica sol used as a binder may be obtained in different ways, for example, by hydrolyzing esters of silicic acid, by partly or completely neutralizing silicate solutions with acids or, for example, by ion-exchange treatment of a silicate solution and concentrating the alkalised silica sol through evaporation. A stable salt-free silicate sol such as this in a concentration of at least 15 percent of $SiO_2$ and with a specific BET-surface of the silica particles of from 150 to 400 square meters/gram is particularly suitable for the process according to the invention in conjunction with a suitable gelation additive and especially in combination with an aqueous suspension of hydrated finely divided MgO, prepared for example by carefully dehydration of basic magnesium carbonate, which is added as a gelling agent just before dispersion into drops in quantities of from 0.1 to 3 percent by weight, based on water-free granulate.

Suitable silicates include mineral clays such as kaolin, montmorillonite, and especially the X-ray-amorphous calcination product of kaolin, precipitated silicate fillers such as the calcium silicates and sodium aluminum silicates and zeolites. In addition to silicates, silica fillers of the type that can be obtained in accordance with German Patent Specification No. 1,049,834 with specific surfaces of from 20 to 200 m²/g may also be used. Instead of, or in addition to, silicates, it is also possible to suspend in the silica sol, carbonates, metal oxides or hydroxides that are compatible therewith. Alkaline earth metal carbonates are particularly suitable, especially calcium carbonate in natural or, preferably, in finely precipitated form. Alkaline earth metal hydroxides are not compatible with a silica sol. By contrast, zinc oxide or basic zinc carbonate may be used. For economic reasons, however, calcium carbonate is preferred, being used in a quantity of at least 5 percent by weight, based on the dry mixture as a whole.

Organic liquids such as hydrocarbons or chlorinated hydrocarbons or even gases are used as the medium immiscible with water for forming the gel beads. In the case of gases, the sol-gel conversion can be carried out in spray driers by evaporating off the water. In this case, there is no need for a gelating agent such as for example MgO which was required in the case of a stable silica sol.

However, the spray drying process only applies to making microbeads for use in fluidized-bed processes. By selecting suitable dispersion apparatus which influences the size of the drops, beads of from 1 to 6 mm in diameter can be obtained in an organic liquid. By spray-drying in the gas zone, spherical particles are also obtained, although they are smaller by at least one order of magnitude. Acid extraction of the cationic constituents, especially of MgO, CaO, $Al_2O_3$ and $Na_2O$, is best carried out in an extraction tower using a mineral acid, preferably after a period of heating at 100° to 800° C. In cases where CaO has to be extracted, it is preferred to use dilute hydrochloric acid or nitric acid, while it is also possible to use dilute sulphuric acid in the case of $Na_2O$ and $Al_2O_3$ contents. On completion of the acid treatment, which is preferably carried out at temperatures above 50° C. and which is intended to dissolve out as many of the cations as possible, excess acid and salts are washed out. The granules which now consist essentially of silica are dried and may even be used as such for a variety of purposes. Service life and breaking strength may be further improved for certain purposes by further heating at temperatures of from 200° to 800° C. and preferably at temperatures of from 400° to 700° C. The catalyst supports in bead form, consisting essentially of silica, prepared in accordance with the invention with porosity values in excess of 60 percent are suitable for all catalytic processes in which silica supports are prepared with catalytically active substances. The high level of porosity enables substances such as these to be used in greater quantities than was the case with conventional supports, thus guaranteeing a higher level of activity. Impregnation of the support with a catalytic substance may be carried out, for example, with acids, particularly phosphoric acid and/or boric acid, for acid-catalyzed reactions; with vanadates for the catalysis of $SO_3$; and with heavy metal salts for metal-catalyzed reactions, although noble metals, such as platinum or palladium for example, may also be deposited on the supports made in accordance with this invention.

The porosity of the bead-form granules can be determined in various ways. It is relatively easy to determine the water-absorbing capacity. For this purpose, 100 g of the granulate are left standing in water for a few hours, suction-filtered on a wide-pore glass frit and briefly surface-dried between two wafers of filter paper. The increase in weight is then determined by weighing. The water-absorbing capacity of the bead-form catalyst supports according to the invention is in excess of 60 grams of water per 100 grams of support and is preferably in excess of 70 g/100 g. If the amount of water absorbed is related to the "apparent volume" of the beads, the porosity is obtained, namely the contribution made by the pore volume to the overall volume.

Porosity can also be calculated from the true density which can be determined, for example, with helium in a gas pyknometer, and the "apparent" density which can be determined with a special pyknometer using mercury, although it can also be calculated by measuring out and weighing the beads. The pore volume is the difference between the apparent volume and the true volume of 1 g of substance.

For a catalyst support consisting essentially of X-ray-amorphous silica, the true density can be expected to have a value of around 2.25. The pore size distribution can be assessed through measurements with a mercury pressure porosimeter, while evaluation of the gas desorption isotherms can be applied in the case of small pore diameters of less than approximately 150 A.

EXAMPLE 1

Two thousand g of pure silica filler with a specific BET surface of 150 $m^2/g$ were precipitated from a sodium silicate solution with sulphuric acid, and 4,000 g of precipitated calcium carbonate with a specific surface of approximately 10 $m^2/g$ and an average particle diameter determined by weighing of 3.9$\mu$, were suspended by means of an intensive mixer in 10 liters of aqueous silica sol (density 1.20 g/ml, 30 percent by weight of $SiO_2$) with a specific BET-surface of 193 $m^2/g$.

The calculated composition of the resulting suspension, based on dry component, was as follows:

37.7% by weight of $SiO_2$ from the silica sol,
20.7% by weight of silica filler ($SiO_2$ with approximately 14% of water of constitution), and
41.6% by weight of $CaCO_3$.

Metering pumps continuously delivered quantities of 10 liters per hour of the aforementioned suspension and 1.5 liters per hour of an aqueous magnesium oxide suspension containing 80 g of MgO per liter to a mixing vessel from which the gel-forming mixture of the two suspensions, divided up by means of a star-shaped distributor into jets, flowed into a column of liquid consisting of a mixture of o-dichlorobenzene and perchlorethylene with a density of 1.4 g/ml was able to flow. The jets were divided up in the organic phase into drops which after a few seconds were solidified by sol-gel conversion into beads of between 3 to 6 mm in diameter.

The granulate, still in the process of being formed, was separated off from the organic phase, dried with saturated steam and freed from adhering organic liquid, dried for another hour at 120° C. in a gentle stream of air and then calcined for 2 hours at 600° C.

The granulate thus treated had a water-absorption capacity of 60 g of water per 100 g.

The water-absorbing capacity of the bead-form material was determined by leaving it standing for several hours in water, separating the granulate from the water by filtration under suction on a wide-pore glass filter, and briefly drying the beads between two wafers of filter paper, followed by weighing.

In order to increase its pore volume and hence its liquid-absorption capacity, the bead-form material was subjected to an acid extraction. For this purpose, the granulate prepared as described above was extracted initially with a weakly hydrochloric calcium chloride solution from a preceding extraction, and then, with an excess of 10 percent hot hydrochloric acid, by pumping the solutions around for 80 minutes until they were completely free from carbonate, washed free from chloride with water, dried and then calcined in an oven for 90 minutes at 700° C.

The catalyst support material thus obtained may be characterized as follows:

Chemical analysis by evaporation with hydrofluoric acid produced a residue of 1.5 percent.
The total pore volume amounted to 1.03 cc/g or 70 percent by volume (porosity), calculated from the apparent and the true density of the granulate.
The water-absorption capacity amounted to 110 g per 100 g of dry material, and the specific surface to 155 $m^2/g$.

EXAMPLE 2

Six thousand g of calcium carbonate were suspended in 10 liters of aqueous stable silica sol (both substances as in Example 1), and the mixture was further processed into a bead-form granulate as described in Example 1.

After drying with steam, the product was calcined in an oven for 1 hour at 500° C. and then extracted with hot 10 percent hydrochloric acid, washed free from chloride, dried in air and calcined for 2 hours at 700° C.

The catalyst support material thus obtained had the following properties:

1. Residue after evaporation with hydrofluoric acid and sulphuric acid: 1.2 percent.
2. Water-absorption capacity: 183 g of water per 100 g of dry granulate.
3. Porosity: 79% by volume or 1.64 ml/g.

EXAMPLE 3

To prepare another catalyst support, 5 kg of a metakaolin prepared by the impact calcination of kaolin (composition : 53.9% of $SiO_2$; 42.5% of $Al_2O_3$ and traces of $TiO_2$, $Fe_2O_3$, $K_2O$, $Na_2O$ and MgO) with a specific BET surface of 22 $m^2/g$ and an average particle diameter of 8.0μ determined by weighing, were suspended in 10 liters of the same silica sol as used in Example 1, and the resulting product was converted into beads of 3 to 6 mm in diameter as described in Example 1. Pure o-dichlorobenzene was used as the water-immiscible organic phase in which the sol-gel conversion takes place. As described in Example 1, the product was dried with steam and then at 200° C. in a gentle stream of air. A granulate with a water-absorption capacity of 68 g of water per 100 g of dry material was obtained.

To increase its pore volume, the granulate was subjected to an acid extraction. For this purpose, a weak hydrochloric acid from a previous extraction was initially used as described in Example 1, followed by 8 hours' extraction with an excess of hot, azeotropic hydrochloric acid in a circuit. The product was then washed free from chloride, dried and calcined for 2 hours at 700° C.

The bead-form catalyst support material obtained had the following properties:

1. Residue after evaporation with hydrofluoric acid and sulphuric acid : 3.3 percent.
2. Water-absorption capacity : 98 g of water per 100 g of dry granulate.
3. Porosity : 65 percent.
4. Specific surface according to BET : 174 m²/g.

EXAMPLE 4

Eighty g of the catalyst support material prepared in accordance with Example 1 (in a grain fraction of from 3 to 4 mm) were introduced into 160 ml of a potassium vanadate solution containing 0.425 m of $V_2O_5$ and 0.85 m of $K_2O$, and left standing at room temperature for a period of 2 hours during which the material was occasionally stirred (preparation of the potassium vanadate solution: 100 g of $NH_4VO_3$ and 96 g of KOH were dissolved in approximately 800 ml of water, and the resulting solution was boiled until no more $NH_3$ escaped and after cooling made up to 1 liter). Thereafter, the granulates were rigorously suction-filtered on a wide-pore glass frit, dried in air and calcined for 2 hours at 500° C. The $V_2O_5$ content amounted to 6.85 percent.

The catalyst support charged with vanadium was sulphatised with gases containing a little $SO_2$ at a temperature of 450° C. by the method normally used for sulphuric acid catalysts, and was tested in an isothermal testing apparatus to access its effectiveness in oxidizing $SO_2$ to $SO_3$ with a gas mixture consisting of 8.6 percent by volume of $SO_2$ and 91.4 percent of air. For a residence time of 1.6 seconds on the catalyst, the conversions were as follows:

| at | 450° C. | | 95.8% |
|---|---|---|---|
| | 430° C. | | 96.8% |
| | 410° C. | | 96.7% |
| | 390° C. | | 95.4% |
| | 380° C. | | 94.0% |
| | 370° C. | approx. | 91 % |
| | 360° C. | approx. | 55 %. |

What is claimed is:

1. Process for the production of catalyst supports in bead form having a porosity of greater than 60 percent, comprising
   A. suspending in a silica sol at least one finely divided solid selected from the group consisting of a silicate, carbonate, metal oxide and metal hydroxide compatible with said silica sol,
   B. dispersing the resulting mixture into drops,
   C. gelling the drops in a medium immiscible with water,
   D. separating the resulting granulate from said medium,
   E. subjecting said granulate to heat treatment at a temperature of from 100° to 800° C,
   F. removing a major portion of the finely divided solid from the granulate by acid leach to obtain a porosity of greater than 60 percent, and
   G. washing the acid treated granulate.
2. Process as claimed in claim 1 wherein said finely divided solid comprises a silicate and an alkaline earth metal carbonate.
3. Process as claimed in claim 1 wherein said silica sol is stable, salt free, contains at least 15 percent by weight of $SiO_2$, and has a specific BET surface of from 150 to 400 sq. meters per gram.
4. Process as claimed in claim 1 wherein a suspension of hydrated magnesium oxide is added as a gel-forming agent during the gelling step.
5. Process as claimed in claim 1 wherein said finely divided solid is a mineral clay silicate.
6. Process as claimed in claim 1 wherein said finely divided solid comprises a zeolite silicate.
7. Process as claimed in claim 1 wherein a precipitated silica filler is added to said silica sol in addition to said finely divided solid.
8. Process as claimed in claim 1 wherein said finely divided solid comprises calcium carbonate.
9. Process as claimed in claim 1 wherein the substances removed by acid treatment constitute at least 5 percent by weight of the finely divided solids initially suspended.
10. Process as claimed in claim 1 wherein the washed acid treated granulate is subjected to a second heat treatment at a temperature of from 200° to 800° C.

* * * * *